(12) United States Patent
Murchison

(10) Patent No.: US 12,061,537 B2
(45) Date of Patent: Aug. 13, 2024

(54) TESTING SOFTWARE CHANGES AND DETERMINING A REPEATABILITY OF SOFTWARE TESTS

(71) Applicant: GM Cruise Holdings LLC, San Francisco, CA (US)

(72) Inventor: Luke Murchison, Belmont, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 71 days.

(21) Appl. No.: 18/075,174

(22) Filed: Dec. 5, 2022

(65) Prior Publication Data

US 2024/0184691 A1 Jun. 6, 2024

(51) Int. Cl.
 *G06F 11/36* (2006.01)
(52) U.S. Cl.
 CPC ........ *G06F 11/368* (2013.01); *G06F 11/3664* (2013.01); *G06F 11/3688* (2013.01)
(58) Field of Classification Search
 None
 See application file for complete search history.

(56) References Cited

U.S. PATENT DOCUMENTS

| | | | | |
|---|---|---|---|---|
| 9,983,981 B1* | 5/2018 | Mundada | ............ | G06F 11/3676 |
| 10,310,966 B1* | 6/2019 | Ge | ........... | H04L 41/145 |
| 11,294,800 B2* | 4/2022 | Hawthorne | ............ | G01C 21/343 |
| 11,740,885 B1* | 8/2023 | Fields | ................. | B60W 50/082 |
| | | | | 717/172 |
| 2023/0350778 A1* | 11/2023 | Lu | ........................ | G06F 11/3684 |

\* cited by examiner

*Primary Examiner* — Marina Lee

(57) ABSTRACT

Systems and techniques are provided for testing software changes and determining a repeatability of software tests. An example method can perform software tests at different timepoints, each software test being based on a test scenario comprising a test simulation environment configured to test a software; determine one or more software tests from the software tests having a variation in test scores that exceeds a divergence threshold, the one or more software tests comprising at least one test scenario; rerun a software test a number of times, the software test configured to test changes to a code of the software, the changes to the code being associated with the software test and/or the at least one test scenario; and determine, based on test scores generated by the software test performed the number of times, a repeatability score for the software test on the changes to the code of the software.

20 Claims, 6 Drawing Sheets

TESTING SOFTWARE CHANGES AND DETERMINING A REPEATABILITY OF SOFTWARE TESTS

TECHNICAL FIELD

The present disclosure generally relates to determining issues in software code and/or in software test scenarios. For example, aspects of the present disclosure relate to systems and techniques for testing software of autonomous vehicles and determining whether specific test scenarios are repeatable in simulation frameworks.

BACKGROUND

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at specific locations on the autonomous vehicles.

BRIEF DESCRIPTION OF THE DRAWINGS

Illustrative examples and aspects of the present application are described in detail below with reference to the following figures.

DETAILED DESCRIPTION

Figure 1:
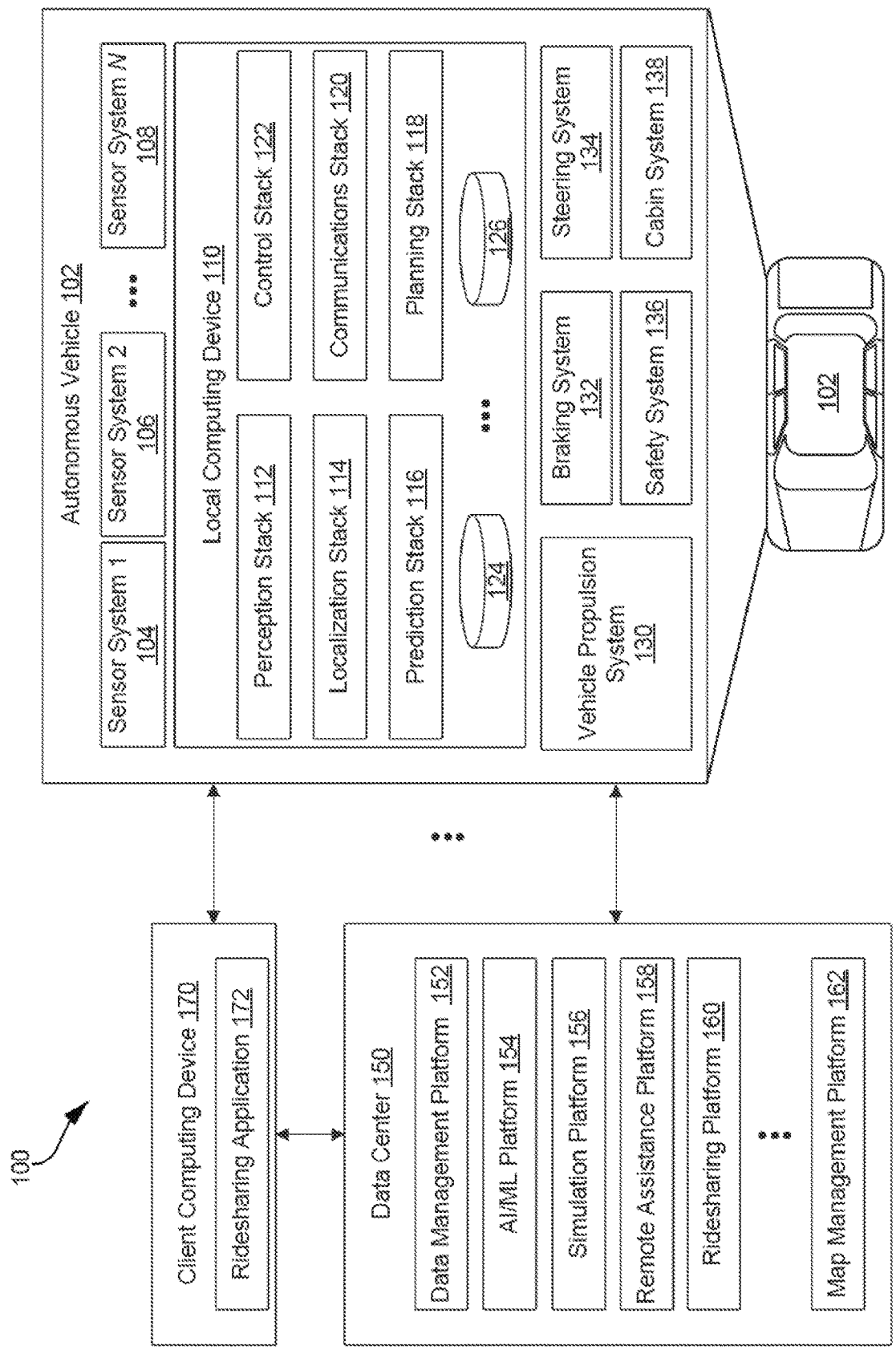
FIG. 1 is a diagram illustrating an example system environment that can be used to facilitate autonomous vehicle (AV) navigation and routing operations, in accordance with some examples of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the application. However, it will be apparent that various aspects and examples may be practiced without these specific details. The figures and description are not intended to be restrictive.

The ensuing description provides aspects and examples of the disclosure, and is not intended to limit the scope, applicability, or configuration of the disclosure. Rather, the ensuing description of the aspects and examples of the disclosure will provide those skilled in the art with an enabling description for implementing an example implementation of the disclosure. It should be understood that various changes may be made in the function and arrangement of elements without departing from the scope of the application as set forth in the appended claims.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As previously explained, autonomous vehicles (AVs) can include various sensors, such as a camera sensor, a light detection and ranging (LIDAR) sensor, a radio detection and ranging (RADAR) sensor, amongst others, which the AVs can use to collect data and measurements that the AVs can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

AV software is generally constructed using frameworks such as, for example, a robot operating system (ROS), which include software stacks configured to perform certain AV operations and/or implement certain AV behaviors. The software stacks can include software nodes configured to generate certain outputs (e.g., perform certain functions/tasks and generate associated outputs). In some examples, a node can include and/or represent a process running on the ROS of an AV. The process can be part of a number of processes associated with an AV stack including the node. One or more of the software nodes may be configured to communicate (e.g., via messages and/or publish/subscribe models) respective outputs to other software nodes configured to generate additional outputs at least partly based on the respective outputs of the one or more software nodes.

For example, nodes can take actions based on information received from other nodes, send information to other nodes, and/or send and receive requests for actions to and from other nodes. Typically, the nodes in the AV software (e.g., in the ROS) may communicate with each other based on contracts. The contracts can define what nodes communicate with what nodes, which nodes are provider nodes (e.g., sender) and which nodes are consumer nodes (e.g., recipient) in specific node communications, what data is communicated between specific nodes, the format of messages communicated between nodes, node dependencies (e.g., what information a node may expect/require from another node), and/or other aspects of node behaviors and/or communications.

In many cases, the AV software (e.g., the ROS) may include AV stacks that have a large number of nodes. Software developers may frequently update and/or modify the AV software (e.g., the AV stacks) in order to, for example and without limitation, modify one or more AV behaviors, implement new AV tasks and/or behaviors, correct issues in the code, modify and/or implement certain parameters, and/or modify one or more AV capabilities. Given the frequency of changes made to the AV software, software developers may run a large number of tests to test and/or validate the AV software and/or code changes, identify any issues in the AV software, and/or troubleshoot any errors in the AV software. However, the large number of nodes and the complexity of the AV stacks can make it very difficult for developers to test and troubleshoot the AV software and/or code changes. Moreover, AV stacks and nodes are often developed and/or maintained by different people and/or teams. As a result, it can be difficult for developers to track the changes to AV stacks and/or nodes made by other developers and/or teams.

In addition, when a person or team makes a change to a configuration/behavior of a node and/or AV stack, such change can impact other nodes and/or AV stacks, which in some cases may be managed by other developers or teams. This can make it difficult to identify the impact of a specific change in the code. Moreover, the frequency of code changes in AV software and the impact of a change to a configuration/behavior of a node and/or AV stack (and thus the impact of a code change) can also make it difficult to identify the cause of an error in the AV software.

For example, when a developer makes a change to a configuration or behavior of an AV stack (and/or an associated node), such a change may cause problems (e.g., errors, etc.) with the AV stack and/or may affect the functionality of other AV stacks (and/or nodes), which in some cases may be managed by other developers and/or teams. If the change breaks or negatively impacts the functionality of an AV stack and/or associated nodes, the developers and/or teams that manage such AV stack and/or nodes may not become aware of the change that caused such issues or the timing when such issues were created, which can make it difficult to troubleshoot the problem.

Problems in the code of an AV stack (and/or a node(s)) may be discovered using end-to-end tests, where all AV stacks and nodes are tested in a simulation framework. However, such end-to-end tests are expensive to run in terms of time and compute cost, and may not be feasible for all scenarios. Moreover, when a problem associated with an AV stack and/or a node(s) arises, it can be difficult to debug the root cause of the problem. The challenges in testing and/or validating AV software are exacerbated a lack of repeatability of certain test scenarios in the simulation framework.

For example, in many cases, a test scenario used to test an AV stack(s) and/or node(s) may include certain conditions, parameters, and/or errors that negatively impact the repeatability of the test scenario. However, the negative impact on the repeatability of a test scenario can really put in question the reliability of that test scenario and/or the code tested using that test scenario. Indeed, a decrease in the repeatability of a test scenario can decrease the reliability of that test scenario and/or the code tested using that test scenario. Unfortunately, given the large number of variables that can impact the repeatability of a test scenario and/or the performance (e.g., the accuracy and/or safety) of code tested using that test scenario, it can be extremely difficult to identify the specific variables that may have caused such a decrease in the repeatability of the test scenario. Indeed, in many cases, it can be difficult to even determine whether a decrease in the repeatability of a test scenario is caused by an issue with the test scenario and/or an issue in the code tested using that test scenario.

Systems, apparatuses, processes (also referred to as methods), and computer-readable media (collectively referred to as "systems and techniques") are described herein for testing software, determining whether specific test scenarios are repeatable in a simulation framework, and/or determining whether any code changes tested using a test scenario(s) have errors/problems. For example, the systems and techniques described herein can be used to test AV software, determine whether a specific test scenario is repeatable in a simulation framework used to test the AV software, and/or determine whether any changes to the AV software code tested using a test scenario(s) have any errors and/or issues.

In some examples, the systems and techniques described herein can identify any issues with one or more test scenarios used to test AV software and/or identify any potential issues in the operation of an AV stack(s). In some cases, the systems and techniques described herein can identify such issues with one or more test scenarios and/or the operation of an AV stack(s) based on a divergent behavior detected for a given set of test conditions. The systems and techniques described herein can also identify whether a software test is repeatable in a simulation framework. Moreover, the systems and techniques described herein can be used to calculate a repeatability score for a given test scenario. The repeatability score can indicate a repeatability frequency and/or percentage of a given test scenario. For example, the repeatability score can indicate a percentage of times and/or frequency in which a given test scenario is repeatable. A developer can use the repeatability score of a given test scenario to determine whether to rely on that test scenario for future/subsequent testing and/or to rely on code tested using that test scenario. In some cases, a developer can use the repeatability score to identify and/or troubleshoot any errors in the test scenario and/or code tested using the test scenario.

In many cases, an AV stack may not be deterministic. This can lead to divergent results/behaviors from a same given input. The systems and techniques described herein can flag any divergent results/behaviors by analyzing test results on a timestamp/temporal basis. The flagged divergent results/behaviors can be used to identify and troubleshoot any errors in a given test scenario and/or the AV software. Moreover, the repeatability score determined for a given test scenario as previously described can be used to validate any tests in a simulation framework and/or any changes in the code of an AV software. In some examples, the systems and techniques described herein can provide testing flexibility, accuracy, and/or efficiency, validate certain tests and/or code changes, and/or determine any test scenarios that may have a lower repeatability score but may nevertheless be ignored (e.g., may be skipped in the analysis and/or troubleshooting of tests) if they do not negatively impact a performance and/or safety of the AV in a meaningful way.

Examples of the systems and techniques described herein are illustrated in FIG. 1 through FIG. 6 and described below.

FIG. 1 is a diagram illustrating an example autonomous vehicle (AV) environment 100, according to some examples of the present disclosure. One of ordinary skill in the art will understand that, for the AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by sensor systems 104, 106, and 108. The sensor systems 104-108 can include one or more types of sensors and can be arranged about the AV 102. For instance, the sensor systems 104-108 can include one or more inertial measurement units (IUs), camera sensors (e.g., still image camera sensors, video camera sensors, etc.), light sensors (e.g., LIDARs, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, time-of-flight (TOF) sensors, seat occupancy sensors, open/closed door sensors, tire pressure sensors, rain sensors, and so forth. For example, the sensor system 104 can include a camera system, the sensor system 106 can include a LIDAR system, and the sensor system 108 can include a RADAR system. Other examples may include any other number and type of sensors.

The AV 102 can include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and/or the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and/or other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162 and/or a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. In some cases, the client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit to a pick-up or drop-off location, and so on.

While the AV 102, the local computing device 110, and the autonomous vehicle environment 100 are shown to include certain systems and components, one of ordinary skill will appreciate that the AV 102, the local computing device 110, and/or the autonomous vehicle environment 100 can include more or fewer systems and/or components than those shown in FIG. 1. For example, the AV 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 6.

As previously explained, the systems and techniques described herein can be used to test software, determine whether specific test scenarios are repeatable in a simulation framework, and/or determine whether any code changes tested using a test scenario(s) have any errors/problems. For example, the systems and techniques described herein can be used to test AV software (e.g., AV stacks, AV nodes, etc.), determine whether a specific test scenario is repeatable in a simulation framework used to test the AV software, and/or determine whether any changes to the AV software code tested using a test scenario(s) have any errors and/or issues.

In some examples, the systems and techniques described herein can identify any issues with any test scenario used to test software and/or identify any potential issues in the operation of an AV stack(s). In some cases, the systems and techniques described herein can identify such issues with one or more test scenarios and/or the operation of an AV stack(s) based on a divergent behavior detected for a given set of test conditions. The systems and techniques described herein can also identify whether a software test is repeatable in a simulation framework. Moreover, the systems and techniques described herein can be used to calculate a repeatability score for a given test scenario. The repeatability score can indicate a repeatability frequency and/or percentage of a given test scenario. For example, the repeatability score can indicate a percentage of times and/or frequency in which a given test scenario is repeatable. A developer can use the repeatability score of a given test scenario to determine whether to rely on that test scenario for future/subsequent testing and/or to rely on code tested using that test scenario. In some cases, a developer can use the repeatability score to identify and/or troubleshoot any errors in the test scenario and/or code tested using the test scenario.

For example, in some cases, because software systems, such as AV software systems, may undergo frequent code changes/updates, the systems and techniques described herein can run tests of software at various timepoints to capture test results and/or snapshots for the software at different times, including any code changes/updates implemented at the various timepoints. The tests can include one or more test scenarios with specific test conditions. For example, the tests can be configured to implement certain testing conditions that test one or more functionalities, parameters, and/or behaviors of the software at the various timepoints. In cases where the software includes AV software used by an AV(s) to control the AV(s) and/or associated behaviors of the AV(s), the systems and techniques described herein can create a particular scene or environment with certain scene elements, conditions, and/or parameters intended to test one or more features of the AV software. The scene elements, conditions, and/or parameters can, in some cases, be at least partly based on a particular feature(s) of the AV software to be tested.

For example, the AV software is modified to implement or adjust capabilities of the AV software for perceiving and understanding a scene having fog conditions (e.g., a threshold amount of fog) and hills with a threshold angle of inclination, the system and techniques described herein can generate a test scenario involving a scene with the fog conditions (e.g., threshold amount of fog) and hills with the threshold angle of inclination. The systems and techniques described herein can run the tests at the various timepoints. The tests can be configured to implement the test scenario and thus test the modified AV software implementing or adjusting the AV software's capabilities for perceiving and understanding a scene having the fog conditions and hills with the threshold angle of inclination.

The systems and techniques described herein can run a certain number (or numbers) of tests and each timepoint, and compare the test results at the different timepoints to identifying any changes in test results. In some examples, the test results can include certain metrics calculated for the AV software based on the test scenario. For example, the test results can include safety and/or performance metrics calculated for the AV software in a simulation framework implementing the test scenario. The systems and techniques described herein can compare the test results to identify any test results that have changes and/or regressed by a threshold amount. To illustrate, in the previous example involving safety and/or performance metrics, the systems and techniques described herein can compare the safety and/or performance metrics included in the test results associated with the various timepoints, and identify any test results where the safety and/or performance metrics have changed and/or diverged by a threshold amount.

The threshold amount can be configurable based on one or more factors. For example, the threshold amount can be determined based on an estimated impact of the test results to the performance and/or safety of the AV, based on a desired sensitivity of the repeatable test and/or software determinations and/or scores, the specific functions and/or capabilities of the AV affected by any changes in the code of the AV software, the type of test scores associated with the test results, and/or any other factors. To illustrate, the threshold amount can be determined based on the type of test scores associated with the test results. For example, if the test scores include safety metrics calculated for one or more code changes, the threshold amount may be smaller and/or more sensitive than if the test scores include performance metrics calculated for the one or more code changes. In this example, the systems and techniques described herein can prioritize safety and/or impacts on safety (e.g., safety sensitivities, code and/or test reliability with regards to safety, etc.) than on performance. In other examples, the systems and techniques described herein may prioritize performance and/or any other types of measures and/or criteria.

For any tests resulting in test results that have changed and/or regressed by the threshold amount, the systems and techniques described herein can perform a pull request (PR) attribution process. The PR attribution process can rerun a certain number of the tests at the various timepoints on certain code changes. In other words, the PR attribution process can test one or more code changes at one or more of the various timepoints by running one or more of the tests previously run at the different time points. The systems and techniques described herein can run each of the tests configured to test the one or more code changes a certain number of times to obtain a certain number of test results for the same test on the same code change(s), which the systems and techniques described herein can use to determine a frequency in which test results from a certain test configured to test the one or more code changes deviate/vary and/or deviate/vary by a threshold amount.

The systems and techniques described herein can calculate a repeatability score for each test scenario (e.g., each test performed to test one or more code changes) based on the test results obtained by rerunning a particular test scenario (e.g., a particular test of one or more code changes) a certain number of times. For example, if the systems and techniques described herein run a test on a particular code change 100 times, and 10 of those times (e.g., 10 of the 100 test results) the test results exceeded a particular threshold and 90 of those times (e.g., 90 of the 100 test results) the test results did not exceed the particular threshold, the systems and techniques described herein can determine that the test scenario involving the particular test of one or more code changes has a repeatability score of 90% (e.g., the test scenario produced results with a variation below the threshold for 90 of the 100 times the test scenario was performed). The repeatability score can indicate the repeatability/non-repeatability of the test scenario in the simulation framework (e.g., of the test on the one or more code changes). In some cases, the repeatability score can indicate the determinism/non-determinism of the process/processes associated with the one or more code changes.

As previously explained, as part of the process of determining repeatability scores, the systems and techniques described herein can run a set of test scenarios at various timepoints and for a certain number of times. The test scenarios can include or involve certain tests generated to test software, such as one or more AV stacks and/or one or more changes to code of one or more AV stacks, and/or certain features of the software, at the various timepoints.

Figure 2:
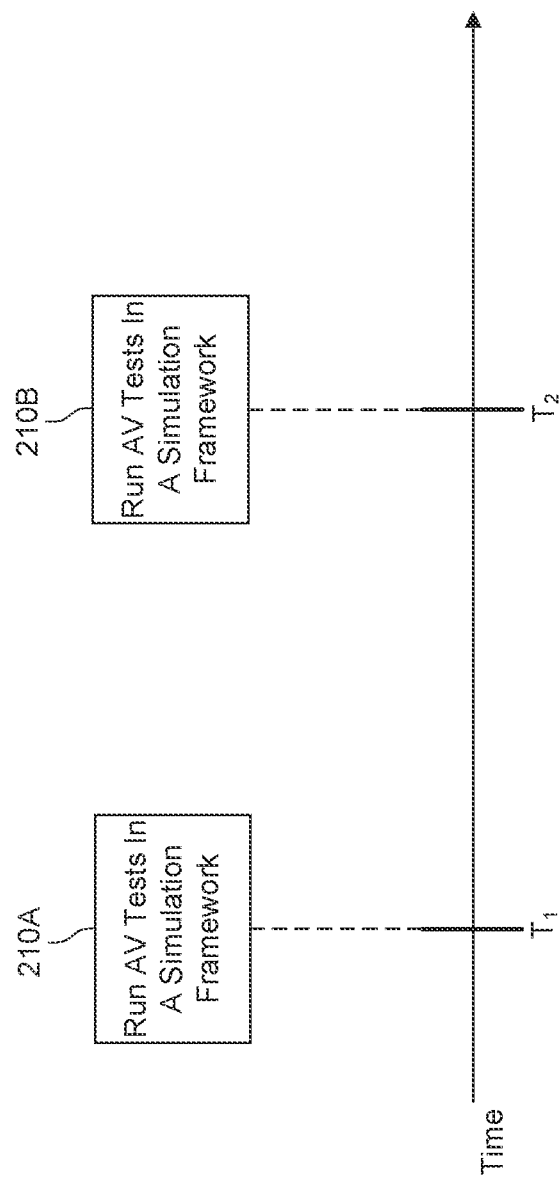
FIG. 2 is a diagram illustrating an example time-based (temporal) approach for testing software to identify divergent behaviors associated with the software, in accordance with some examples of the present disclosure.

FIG. 2 is a diagram illustrating an example time-based (temporal) approach for testing software to identify divergent behaviors associated with the software, according to some examples of the present disclosure. The time-based or temporal approach can run a set of tests configured to test software, code changes of the software, and/or certain features of the software (and/or code changes of the software) at different timepoints. The test results from the set of tests can be used to select one or more test scenarios to re-run on one or more code changes as part of a PR attribution process as previously described. The example time-based (e.g., temporal) approach illustrated in FIG. 2 and described below can be used to test any type of software. For clarity and explanation purposes, the time-based approach for testing software will be described with respect to AV software. However, the time-based approach for testing software illustrated in FIG. 2 is not limited to testing AV software and can be implemented to test other types of software.

The time-based approach can run AV tests 210A at time $t_1$ and AV tests 210B at time $t_2$. As shown in FIG. 2, the AV tests 210A and 210B can thus test any changes to the code of the AV software that occurred at time $t_1$, time $t_2$, and anytime between time $t_1$ and time $t_2$. For explanation purposes, the AV tests 210A and 210B may in some cases be collectively referenced herein as AV tests 210.

In some examples, the AV tests 210A can implement a particular test scenario in a simulation framework. For example, the AV tests 210A can be configured to test certain features and/or aspects of the AV software and/or associated code changes. To illustrate, in some cases, the AV tests 210A can implement a certain scene configured to have certain scene elements (e.g., scene assets such as vehicles, pedestrians, objects, traffic signs, structures, streets, intersections, lanes, etc.), certain testing conditions (e.g., weather, visibility conditions, traffic conditions, environmental conditions, etc.), and/or certain test variables; and/or configured to test certain AV software features/capabilities, certain code changes, certain components of the AV software, and/or certain aspects of the AV software.

Similarly, the AV tests 210B can implement a particular test scenario in a simulation framework. For example, the AV tests 210B can be configured to test certain features and/or aspects of the AV software and/or associated code changes. To illustrate, in some cases, the AV tests 210B can implement a certain scene configured to have certain scene elements, certain testing conditions, and/or certain test variables; and/or configured to test certain AV software features/capabilities, certain code changes, certain components of the AV software, and/or certain aspects of the AV software. In some cases, the AV tests 210A can implement a different test scenario(s) than the AV tests 210B. In other cases, the AV tests 210A can implement a same test scenario(s) as the AV tests 210B.

In some examples, the AV tests 210A can include a certain number of tests implementing a particular test scenario. For example, the AV tests 210A can include a test scenario executed n number of times to yield n number of tests, and the AV tests 210B can include a same or different test scenario executed n number of times to yield n number of tests.

The number of times that a test scenario(s) is executed via the AV tests 210 can be configurable. For example, the number of times that a test scenario(s) is executed via the AV tests 210 can be determined based on a desired sensitivity sought in the associated test results and/or repeatability scores to be calculated as further described herein. As another example, the number of times that a test scenario(s) is executed via the AV tests 210 can be determined based on a type of score(s) or metric(s) calculated using the AV tests 210. To illustrate, the number of times that a test scenario(s) is executed via the AV tests 210 can be based on whether the associated test results include safety metrics, performance metrics, and/or any other metrics. In this example, the number of times that a test scenario(s) is executed via the AV tests 210 can be different when the associated test results include safety metrics than when the test results include performance metrics and/or any other type of metrics/scores.

The simulation framework can include a particular framework for simulating specific systems (e.g., AV systems), scenarios, scenes/environments, and/or conditions. For example, the simulation framework can describe object-level simulation scenario data (e.g., types and/or characteristics of scene assets/elements, positions of scene assets/elements, orientations of scene assets/elements, directions of scene assets/elements, velocities of scene assets/elements, AV behaviors, behaviors of other road users (e.g., other vehicles, pedestrians, bicycle and/or motorcycle riders, etc.), velocities of scene assets/elements, etc.), scene characteristics (e.g., a density and/or quantity of scene assets/elements, roadway information and/or characteristics, environmental information and/or characteristics, illumination properties, certain scene activity, etc.), a specific parameterized environment, certain test conditions, one or more scene parameters, navigation constraints, virtual world simulation environment properties, sensor and perception subsystem simulation, planning and/or control subsystem simulation, and/or any other simulation details/characteristics.

The number of timepoints and/or AV tests shown in FIG. 2 are merely non-limiting illustrative examples provided for explanation purposes. One of ordinary skill in the art will recognize that other examples can include a different number of timepoints and/or AV tests than shown in FIG. 2.

Figure 3:
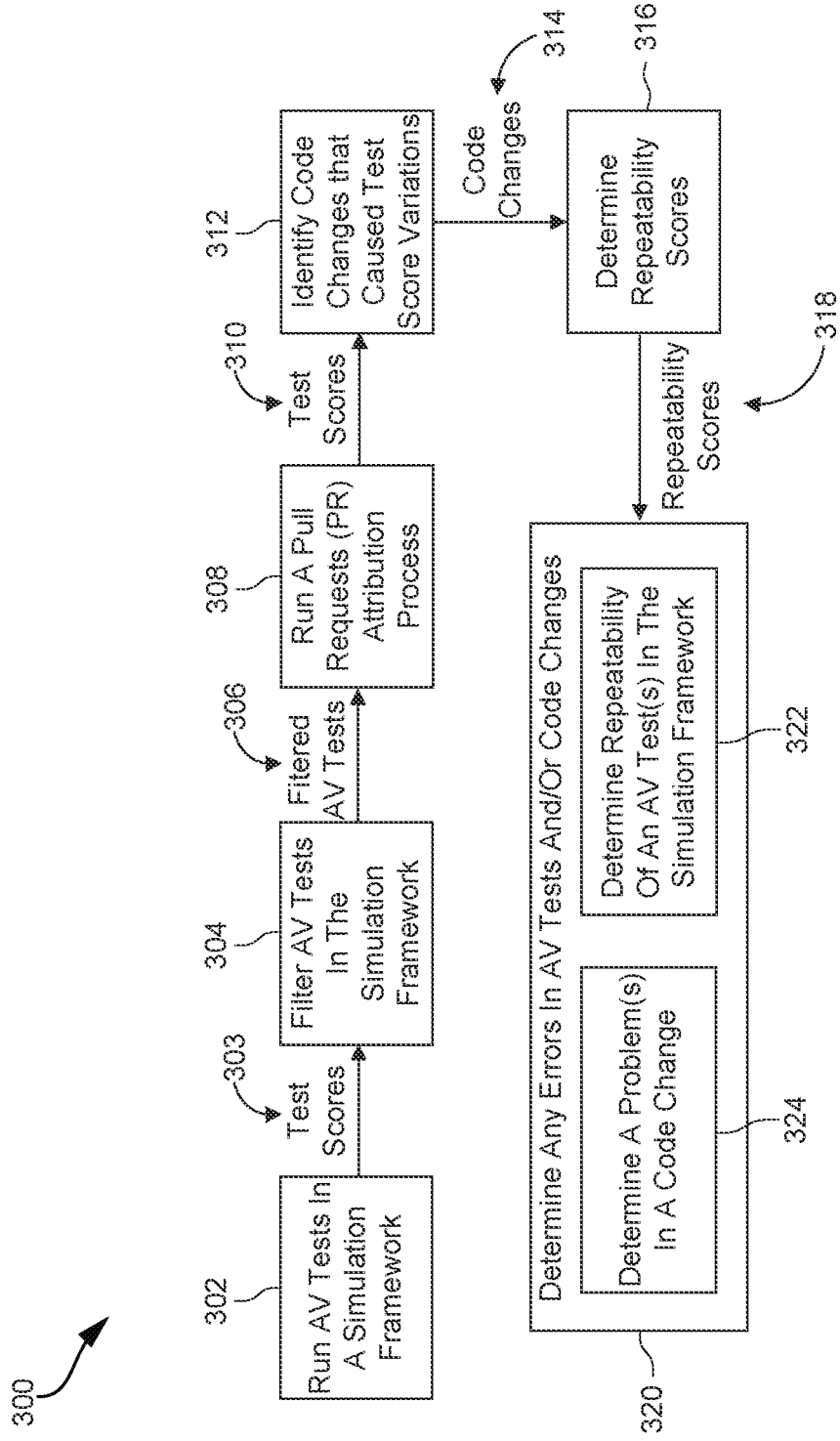
FIG. 3 is a flowchart illustrating an example process for determining repeatability scores and any errors in autonomous vehicle tests and/or software code changes, in accordance with some examples of the present disclosure.

FIG. 3 is a flowchart illustrating an example process 300 for determining repeatability scores and any errors in AV tests and/or software code changes, according to some examples of the disclosure. At block 302, the process 300 can include running AV tests 210 in a simulation framework. In some examples, the AV tests 210 can be executed at various timepoints, such as times $t_1$ and $t_2$ as shown in FIG. 2. The AV tests 210 can produce test scores 303. In some examples, the test scores 303 can include certain metrics measured for the AV software tested by the AV tests 210, such as safety metrics, performance and/or accuracy metrics, comfort metrics, capability metrics, perception metrics, planning metrics, and/or any other metrics.

At block 304, the process 300 can include filtering AV tests in the simulation framework based on the test scores 303. For example, the process 300 can include filtering out (e.g., removing, excluding, etc.) certain tests from the AV tests 210 based on the test scores 303 and one or more divergence thresholds. The one or more divergence thresholds can define a certain amount or percentage variation in test scores, which can be used to filter out any AV tests having associated test scores that do not change or include some changes that are below the one or more divergence thresholds.

For example, assume that the one or more divergence thresholds define an example divergence threshold of 0.2. Here, the divergence threshold of 0.2 can mean that any test results having test score differences of 0.2 and above satisfy the one or more divergence thresholds and any test results having test score differences of less than 0.2 do not satisfy the one or more divergence thresholds. In other words, any AV tests with test results having test score differences of less than 0.2 will be filtered out (e.g., removed, excluded, etc.) because they do not satisfy the one or more divergence thresholds, and any AV tests with test results having test score differences of 0.2 and above will be repeated as such AV tests satisfy the one or more divergence thresholds. To illustrate, assume that the AV tests 210 include 100 tests and 80 of the tests produce test results with test score differences of less than 0.2 and 20 of the tests produce test results with test score differences of 0.2 or above. In this example, given the example divergence threshold of 0.2, the process 300 can determine that 20 of the AV tests 210 satisfy the divergence threshold and thus should be repeated, and 80 of the AV tests 210 do not satisfy the divergence threshold and thus should be filtered out (e.g., should not be repeated).

The filtering of the AV tests can produce one or more filtered AV tests 306 to be repeated as part of a PR attribution process, as further described herein. The one or more filtered AV tests 306 can include those AV tests with test score differences that satisfy the one or more divergence thresholds (e.g., having test score differences of 0.2 or above).

In some cases, the one or more divergence thresholds and/or the magnitude of the one or more divergence thresholds can depend on one or more factors. For example, the one or more divergence thresholds and/or magnitude of the one or more divergence thresholds can depend on how a user or customer of the AV software uses the test results and/or the AV software (and/or associated code changes) and/or if the code changes produce a certain change in the behavior of the AV when the test results vary by the amount defined by the one or more divergence thresholds (or at all). To illustrate, if a certain code change and/or the AV software with the code change results in a change in the behavior of the AV, such as a behavior of the AV related to a safety of the AV (e.g., a change in a safety metric), the one or more divergence thresholds may be reduced (e.g., such that a smaller test score variation may satisfy the one or more divergence thresholds) than in cases where the AV software with the code change and/or the code change does/do not result in such a change in the behavior of the AV.

In some examples, the one or more divergence thresholds and/or a magnitude of the one or more divergence thresholds can depend on the type of change in AV behavior caused by the AV software with the code change and/or the code change. For example, if a certain code change and/or the AV software with the code change results in a change in the behavior of the AV related to a safety of the AV (e.g., a change in a safety metric), the one or more divergence thresholds may be reduced (e.g., such that a smaller test score variation may satisfy the one or more divergence thresholds) than in cases where the AV software with the code change and/or the code change do not result in such a change in the behavior of the AV or result in a change in the behavior of the AV related to another aspect(s) of the operation of the AV such as, for example and without limitation, a performance of the AV (e.g., a performance metric), a comfort of the AV (e.g., a comfort metric), an accuracy of the AV (e.g., an accuracy metric), etc.

At block 308, the process 300 can include running a PR attribution process based on the one or more filtered AV tests 306. The PR attribution process can rerun each of the one or more filtered AV tests 306 a certain number of times on certain code changes. In some examples, the PR attribution process can rerun each of the one or more filtered AV tests 306 a certain number of times on certain code changes and at one or more timepoints. In other words, the PR attribution process can test one or more code changes at one or more timepoints by running each of the one or more filtered AV tests 307 a certain number of times at each of the one or more timepoints. For example, if the one or more filtered AV tests 306 include 2 different test scenarios, the PR attribution process can run each test scenario a certain number of times on one or more code changes, such as one or more changes to a code of one or more AV stacks and/or nodes, for example. This way, the PR attribution process can test the one or more code changes a certain number of times to obtain a number of test results for the same test scenario on the same code change(s), which can be used to determine a frequency in which test results from the executed test instances of the one or more filtered AV tests 306 deviate/vary/diverge by a threshold amount (e.g., the one or more divergence thresholds).

The PR attribution process can yield test scores 310 for the testing instances of the one or more filtered AV tests 306. In some examples, the test scores 310 can include one or more metrics such as, for example and without limitation, safety metrics, performance and/or accuracy metrics, comfort metrics, capability metrics, perception metrics, planning metrics, and/or any other metrics. In some examples, the one or more metrics can correspond to the test scenario(s) executed, including the one or more code changes and the simulation environment(s) associated with the one or more filtered AV tests 306.

In some examples, the PR attribution process can sample AV tests having test results that included score variations that satisfy the one or more divergence thresholds (e.g., the one or more filtered AV tests 306), and run the sampled AV tests multiple times. The test results from running the sampled AV tests multiple times can be used to identify code changes that caused test score variations and determine repeatability scores, as further described below.

At block 312, the process 300 can include identifying code changes 314 that caused test score variations. The code changes 314 that caused the test score variations can be identified based on the test scores 310. For example, the test scores 310 can be compared to identify any test score differences. The test score differences can be attributed to one or more respective AV tests and one or more respective code changes tested by the one or more respective AV tests, and thus can be used to identify the code changes that caused test score variations. In some cases, the test score variations can be based on one or more divergence thresholds. In other words, the process 300 can identify code changes that caused test score variations, when tested via the one or more filtered AV tests 306, that satisfy or exceed the one or more divergence thresholds.

For example, if the process 300 runs a test a certain number of times on each particular code change implemented at/within one or more timepoints, and one or more code changes produced test results that satisfy the one or more divergence thresholds, the process 300 can identify the one or more code changes as the code changes 314 that caused the test score variations.

At block 316, the process 300 can include determining repeatability scores 318 for each test scenario involving a particular test(s) and the code changes 314. The process 300 can identify the repeatability scores 318 based on the number of test results produced by the particular test(s) on the code changes 314 that experienced/included test score variations that satisfy the one or more divergence thresholds.

For example, if a particular test on the code changes 314 was performed 1000 times and 100 of those times (e.g., 100 of the 1000 test results) the test results satisfied or exceeded a divergence threshold and 900 of those times (e.g., 900 of the 1000 test results) the test results did not exceed the divergence threshold, the process 300 can determine that the test scenario involving the particular test performed on the code changes 314 has a repeatability score of 90% (e.g., the test scenario involving the code changes 314 produced results with a variation below the divergence threshold for 900 of the 1000 times the test scenario was performed).

The repeatability scores 318 can indicate the repeatability/non-repeatability of the test scenario in the simulation framework involving the test performed on the code changes 314. In some cases, the repeatability scores 318 can indicate the determinism/non-determinism of the process/processes associated with the code changes 314.

In some examples, at block 320, the process 300 can optionally determine any errors in one or more AV tests and/or the code changes 314. For example, at block 322, the process 300 can optionally include determining a repeatability of an AV test(s) in the simulation framework. The repeatability can be determined based on the repeatability scores 318. For example, the AV test(s) can include a test performed on the code changes 314. That test can be associated with a repeatability score from the repeatability scores 318. That repeatability score can be used to determine a repeatability of that AV test(s). In some examples, the repeatability can be defined or described by the associated repeatability score itself, or the repeatability score can be used to characterize, summarize, and/or detail a repeatability of the AV test(s).

In some examples, at block 324, the process 300 can optionally include determining a problem(s) in a code change from the code changes 314. For example, in some cases, the process 300 can use a repeatability score (e.g., from the repeatability scores 318) calculated for a test on a code change to determine if there are any problems in the code change. To illustrate, if the repeatability score associated with a test performed on a code change indicates that a test result generated when testing the code change is only repeatable a certain number and/or percentage of times that the code change is tested (and/or is repeatable only a certain number and/or percentage of times that is less than a certain threshold, the code change can be identified as having a problem that results in divergent behaviors when implementing and/or testing that code change.

In some cases, the threshold and/or the magnitude of the threshold can depend on one or more factors. For example, the threshold and/or magnitude of the threshold can depend on how a user or customer of the code change uses the test results of the code change and/or if the code change produces a certain change in the behavior of the AV when the test results vary by the threshold amount (or at all).

In some examples, the repeatability scores 318 and/or the detected errors in the AV tests and/or the code changes can be used to troubleshoot the code changes and/or the AV tests, decide whether to rely on the code changes and/or AV tests, decide whether to use or modify the code changes and/or AV tests, determine whether to troubleshoot an associated simulation framework, determine whether to use or modify an associated simulation framework, and/or determine how to use and/or modify the code changes, the AV tests, and/or the simulation framework.

Figure 4:
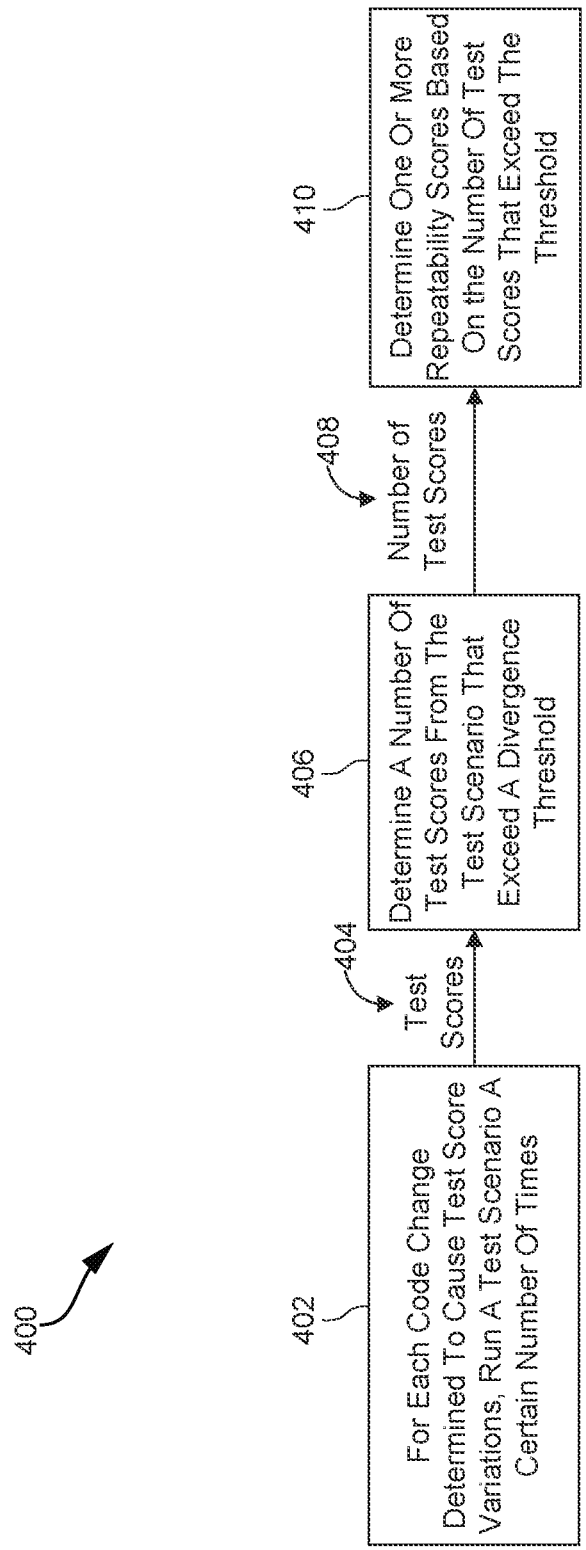
FIG. 4 is a flowchart illustrating an example process for determining repeatability scores for test scenarios, in accordance with some examples of the present disclosure.

FIG. 4 is a flowchart illustrating an example process 400 for determining repeatability scores for test scenarios (e.g., specific tests performed on a software and/or associated code change(s)), according to some examples of the present disclosure. At block 402, the process 400 can include running, for each code change determined to cause test score variations (e.g., each of the code changes 314 identified at block 312 of FIG. 3), a test scenario a certain number of times. In some examples, each test scenario can include a particular test/testing simulation in a simulation framework used to test a code change associated with the test scenario.

In some cases, the test scenario is performed for each code change determined to cause one or more test score variations that exceed a divergence threshold, as previously described. Moreover, the number of times that a test scenario is executed can depend on one or more factors such as, for example and without limitation, a desired sensitivity and/or fidelity of the repeatability scores, a value and/or magnitude of the divergence threshold used to select the test scenario (e.g., the test being performed and/or the code change being tested), an estimated impact of a code change associated with the test scenario on a behavior of the AV (e.g., if the code change impacts a safety metric and/or an AV behavior associated with an AV safety, the process 400 may run the test scenario more times than if the code change impacts a different metric(s) and/or a different AV behavior associated with another AV metric(s)).

The test scenario executed at block 402 can result in test scores 404 associated with the test scenario. In some cases, the test scores 404 can include one or more metrics calculated for a code change based on the test scenario. The one or more metrics can include, for example and without limitation, a safety metric, a performance metric, a comfort metric, an accuracy metric, and/or any other metric.

At block 406, the process 400 can include determining a number of test scores 408 from the test scenario executed that exceed a divergence threshold, such as the divergence threshold previously described with respect to FIG. 3. The process 400 can determine the number of test scores 408 from the test scenario executed that exceed the divergence threshold based on the test scores 404 determined at block 402. For example, the process 400 can compare the test scores 404 and identify how many of the test scores 404 vary/diverge by a certain amount defined by the divergence threshold (and/or more than the amount defined by the divergence threshold).

At block 410, the process 400 can include determining one or more repeatability scores for the test scenario based on the number of test scores 408 that exceed the divergence threshold. In some examples, the process 400 can determine the one or more repeatability scores for the test scenario based on the number of test scores 408 that exceed the divergence threshold and the total number of tests performed with the test scenario. In some cases, the process 400 can determine the one or more repeatability scores for the test scenario based on a result of 1 minus a percent of the tests that have variations/differences that satisfy or exceed the divergence threshold.

For example, assume that the process 400 ran the test scenario 100 times at block 402 and determined at block 406 that 25 of the 100 times that the process 400 ran the test scenario (e.g., 25 test scores from the 100 test scores associated with the 100 tests) resulted in test scores with variations/differences that satisfy or exceed the divergence threshold. In this example, the 25 test scores with variations/differences that satisfy or exceed the divergence threshold from the total 100 test scores means that the test scores resulted in variations/differences satisfying or exceeding the divergence threshold 25% (e.g., 0.25) of the times (e.g., the 100 times) that the process 400 ran the test scenario. Thus, to determine the repeatability score associated with the test scenario, the process 400 can subtract 0.25 (e.g., corresponding to the 25% of test scores with variations/differences that satisfy or exceed the divergence threshold) from 1, which yields a 75% repeatability score (e.g., 1-0.25=0.75 or 75%).

In some examples, the process 400 can surface the repeatability score calculated at block 410 to a user(s) of the tested software so the user(s) is aware that the test scenario has a certain percent (e.g., 75% in the previous example) probability of yielding a particular score (e.g., the test score achieved on 75% of the tests in the previous example) due to a non-determinism which affects the repeatability of the test scenario so the user(s) can decide whether to use, rely on, and/or trust test scores associated with the test scenario. Such non-determinism (e.g., the variations/differences in test scores) of the test scenario, which can affect the repeatability of the test scenario, can be caused by issues with the code being tested and/or the particular test executed on that code (e.g., the particular testing simulation performed on the code).

In some examples, the non-determinism of the test scenario and the associated non-repeatability (e.g., the variations/differences in test scores) can be used to troubleshoot the code tested by the test scenario and/or the particular test executed on that code (e.g., the particular testing simulation performed on that code). In other examples, the non-determinism of the test scenario and the associated non-repeatability (e.g., the variations/differences in test scores) can additionally or alternatively be used to remove from circulation any tests associated with the test scenario (e.g., remove any tests associated with the test scenario from the body of tests maintained for testing software, such as AV stacks and/or nodes). For example, in some cases, a repository of tests can store a body of tests that are automatically executed at certain intervals of time or based on certain triggering events (e.g., code changes, certain test results, issues with a software code, etc.). If a particular test results in a repeatability score that is below a threshold, that test may be removed from the repository of tests to prevent use of such tests by the automated testing process.

In some cases, the repeatability scores can be used to flag any PRs (e.g., commit commands) that regress the deterministic quality of the simulation framework and/or the software framework (e.g., the AV software framework). For example, assume that a set of PRs are executed on a particular day and the system subsequently ran automatically a set of tests on the set of PRs and determined, based on the set of tests, that the set of PRs decreased how repeatable the tests are (e.g., as determined based on repeatability scores), the system can flag the regression caused by the set of PRs (e.g., the decrease in how repeatable the tests are). The system can then run the PR attribution process on the set of PRs to assess the repeatability (e.g., and/or to obtain repeatability scores) of test scores associated with the set of PRs. In some examples, once the system identifies PRs having test scores that vary/differ by a threshold amount, the system can run individual tests on individual PRs to obtain a more detailed analysis of the PRs, the individual tests, and/or the simulation framework used to run the tests.

Figure 5:
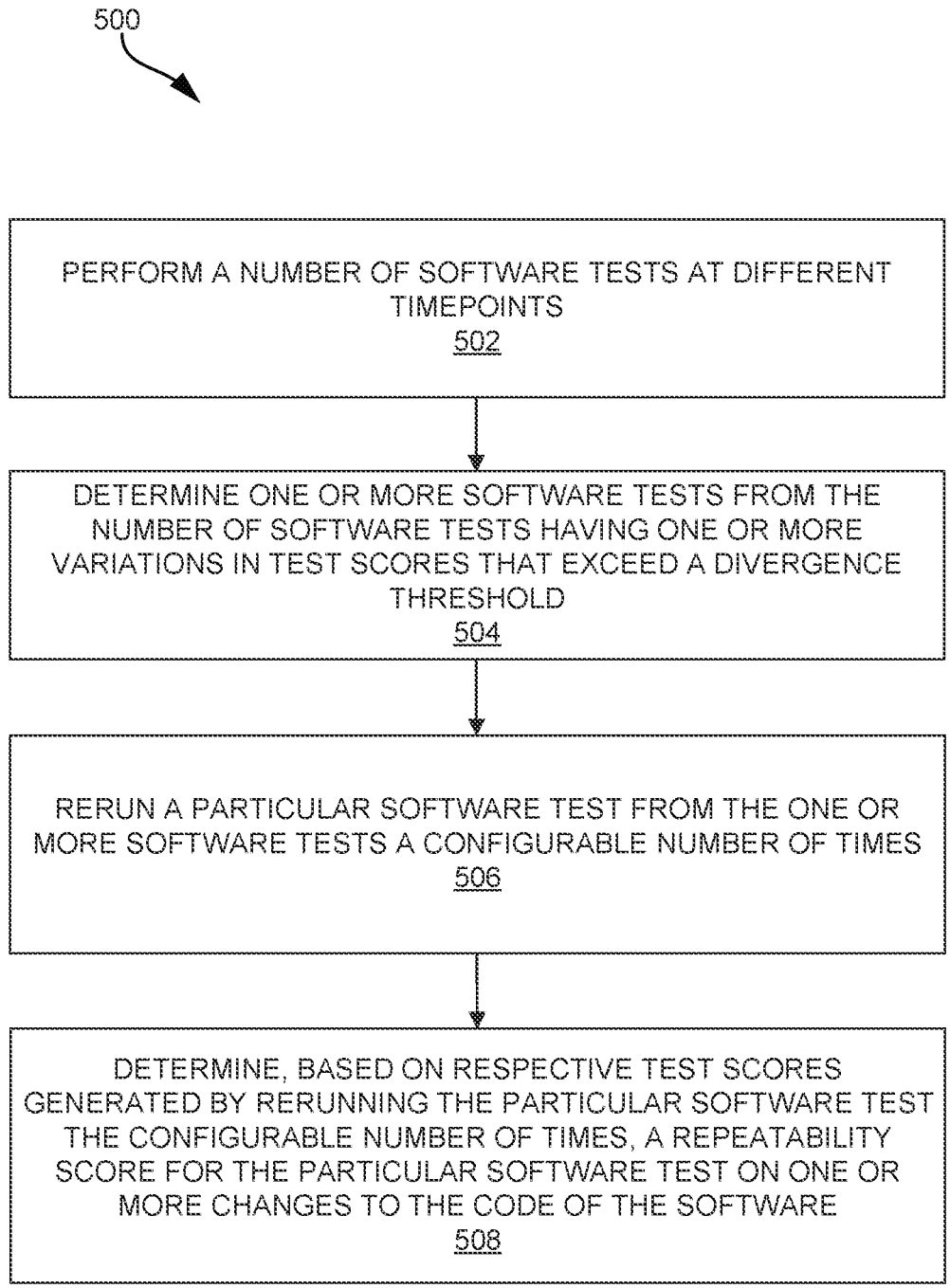
FIG. 5 is a flowchart illustrating another example process for determining repeatability attributes of software tests and/or software code changes tested by the software tests, in accordance with some examples of the present disclosure.

FIG. 5 is a flowchart illustrating another example process 500 for determining repeatability attributes of software tests and/or software code changes tested by the software tests, according to some examples of the present disclosure. At block 502, the process 500 can include performing a number of software tests at different timepoints. In some examples, each software test from the number of software tests can be based on a test scenario. In some cases, test scenario can include a test simulation environment configured to test a software. For example, the test scenario can include a test simulation environment configured to test one or more AV stacks of an AV software.

In some examples, the test simulation environment can describe object-level simulation scenario data (e.g., types and/or characteristics of scene assets/elements, positions of scene assets/elements, orientations of scene assets/elements, directions of scene assets/elements, velocities of scene assets/elements, AV behaviors, behaviors of other road users (e.g., other vehicles, pedestrians, bicycle and/or motorcycle riders, etc.), velocities of scene assets/elements, etc.), scene characteristics (e.g., a density and/or quantity of scene assets/elements, roadway information and/or characteristics, environmental information and/or characteristics, illumination properties, certain scene activity, etc.), a specific parameterized environment, certain test conditions, one or more scene parameters, navigation constraints, virtual world simulation environment properties, sensor and perception subsystem simulation, planning and/or control subsystem simulation, and/or any other simulation details/characteristics. In some cases, the test simulation environment can be generated and/or executed in a simulation framework, as previously described.

At block 504, the process 500 can include determining one or more software tests from the number of software tests having one or more variations in test scores (e.g., test score variations) that exceed a divergence threshold. In some examples, the one or more software tests can include at least one test scenario. For example, the one or more software tests can include the test scenario associated with the number of software tests at block 502.

In some examples, determining the one or more software tests from the number of software tests having one or more variations in test scores that exceed the divergence threshold can include identifying each software test, from the number of software tests, that has a test score that is less than the divergence threshold; filtering the number of software tests at different timepoints to exclude each software test that has the test score that is less than the divergence threshold; and determining the one or more software tests based on the filtering of the number of software tests to exclude each software test that has the test score that is less than the divergence threshold.

In some aspects, the divergence threshold can be determined based on an estimated change in a behavior of an AV associated with one or more portions of the software including the one or more changes to the code of the software, one or more actions associated with the one or more portions of the software, and/or a desired sensitivity or resolution of the repeatability score.

At block 506, the process 500 can include rerunning a particular software test from the one or more software tests a configurable number of times. In some examples, the particular software test can be configured to test one or more changes to a code of the software. The one or more changes to the code of the software can be associated with the particular software test from the one or more software tests and/or the at least one test scenario.

At block 508, the process 500 can include determining, based on respective test scores (e.g., test scores 310) generated by rerunning the particular software test the configurable number of times, a repeatability score (e.g., a repeatability score from the repeatability scores 318) for the particular software test on the one or more changes to the code of the software. In some examples, the respective test scores can include one or more metrics associated with an AV. The one or more metrics can include, for example and without limitation, a safety metric, a performance metric, a comfort metric, and/or an accuracy metric.

In some cases, determining the repeatability score for the particular software test on the one or more changes to the code of the software can include determining a percent of the respective test scores that has a respective test score variation value that is less than the divergence threshold or equal to zero; and determining the repeatability score based on the percent of the respective tests scores that has the respective test score variation value that is less than the divergence threshold or equal to zero. For example, if 80% of all the test scores generated by rerunning the particular software test the configurable number of times have values that are less than the divergence threshold or are equal to zero, the repeatability score can be 80% (e.g., an 80% repeatability of the particular software test).

In some cases, determining the repeatability score for the particular software test on the one or more changes to the code of the software can include determining a value indicating a percent of the respective test scores that has a respective test score variation value that is greater than the divergence threshold; and determining the repeatability score based on a result of one minus the value indicating the percent of the respective test scores that has the respective test score variation value that is greater than the divergence threshold. In some examples, the value can be within a range of zero to one. For example, the value can be 0 if there are no test score variations, 1 if all test scores are different, and a number between 0 and 1 if more than 0% and less than 100% of the test scores are different. To illustrate, if the value is 0.3 indicating that 30% of the respective test scores have a respective test score variation value that is greater than the divergence threshold, the repeatability score can be determined as follows: 1−0.3=0.7 or 70%.

In some aspects, the process 500 can include determining, based on the repeatability score, a repeatability of the particular software test, an error in the one or more changes to the code of the software, and/or one or more causes of a regression of the repeatability of the particular software test.

Figure 6:
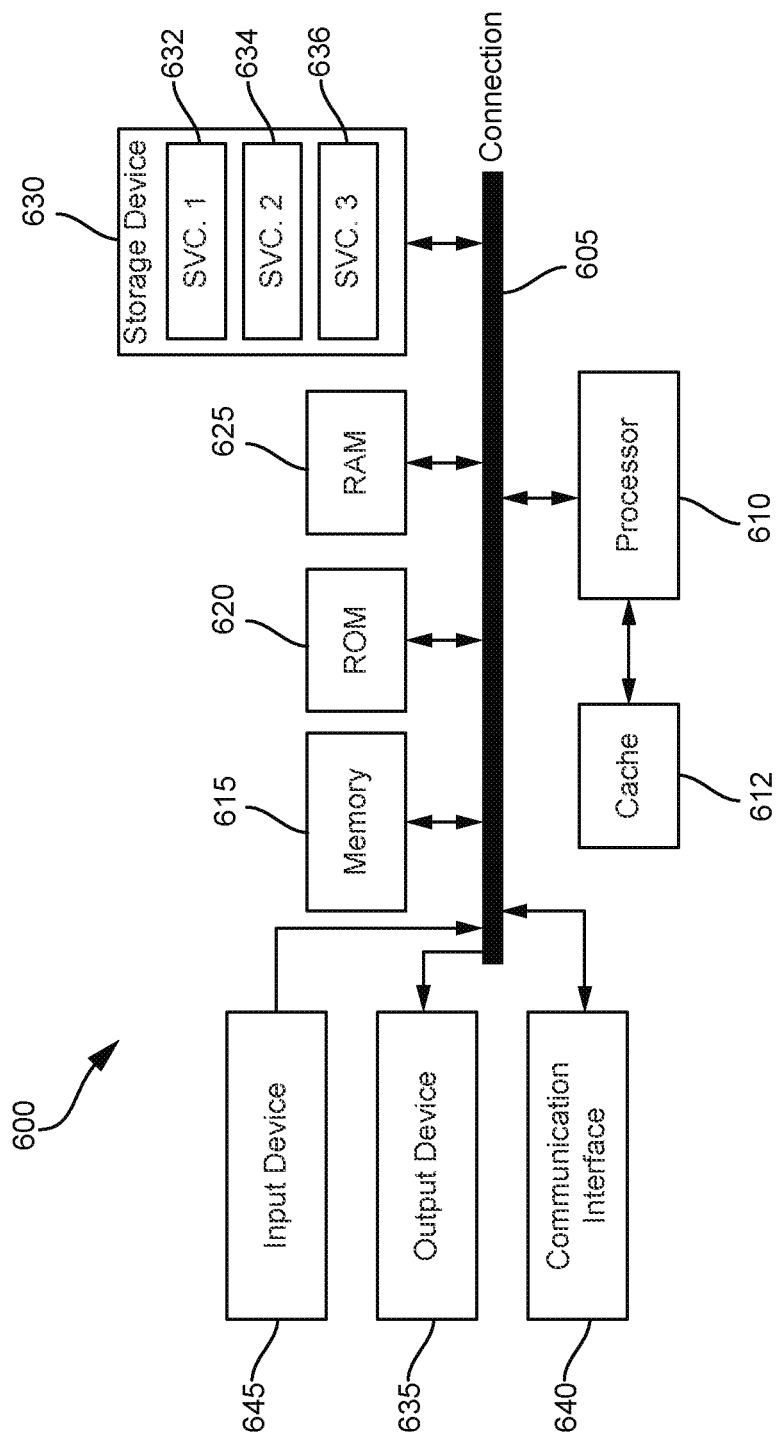
FIG. 6 is a diagram illustrating an example system architecture for implementing certain aspects described herein.

FIG. 6 illustrates an example processor-based system with which some aspects of the subject technology can be implemented. For example, processor-based system 600 can be any computing device making up local computing device 110, remote computing system 190, a passenger device (e.g., client computing device 170) executing the ridesharing application 172, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some examples, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random-access memory (RAM) 625 to processor 610. Computing system 600 can include a cache of high-speed memory 612 connected directly with, in close proximity to, and/or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 can include an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L#), resistive random-access memory (RRAM/ReRAM), phase change memory (PCM), spin transfer torque RAM (STT-RAM), another memory chip or cartridge, and/or a combination thereof.

Storage device 630 can include software services, servers, services, etc., that when the code that defines such software is executed by the processor 610, causes the system to perform a function. In some examples, a hardware service that performs a particular function can include the software component stored in a computer-readable medium in connection with the necessary hardware components, such as processor 610, connection 605, output device 635, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B"

can mean A, B, or A and B, and can additionally include items not listed in the set of A and B.

Illustrative examples of the disclosure include:

Aspect 1. A system comprising: memory; and one or more processors coupled to the memory, the one or more processors being configured to: perform a number of software tests at different timepoints, each software test from the number of software tests being based on a test scenario, the test scenario comprising a test simulation environment configured to test a software; determine one or more software tests from the number of software tests having one or more variations in test scores that exceed a divergence threshold, the one or more software tests comprising at least one test scenario; rerun a particular software test from the one or more software tests a configurable number of times, the particular software test being configured to test one or more changes to a code of the software, wherein the one or more changes to the code of the software are associated with at least one of the particular software test from the one or more software tests and the at least one test scenario; and determine, based on respective test scores generated by rerunning the particular software test the configurable number of times, a repeatability score for the particular software test on the one or more changes to the code of the software.

Aspect 2. The system of Aspect 1, wherein determining the repeatability score for the particular software test on the one or more changes to the code of the software comprises: determining a percent of the respective test scores that has a respective test score variation value that is at least one of less than the divergence threshold and equal to zero; and determining the repeatability score based on the percent of the respective tests scores that has the respective test score variation value that is at least one of less than the divergence threshold and equal to zero.

Aspect 3. The system of any of Aspects 1 or 2, wherein determining the repeatability score for the particular software test on the one or more changes to the code of the software comprises: determining a value indicating a percent of the respective test scores that has a respective test score variation value that is greater than the divergence threshold, wherein the value is within a range of zero to one; and determining the repeatability score based on a result of one minus the value indicating the percent of the respective test scores that has the respective test score variation value that is greater than the divergence threshold.

Aspect 4. The system of any of Aspects 1 to 3, wherein determining the one or more software tests from the number of software tests having one or more variations in test scores that exceed the divergence threshold comprises: identifying each software test, from the number of software tests, that has a test score that is less than the divergence threshold; filtering the number of software tests at different timepoints to exclude each software test that has the test score that is less than the divergence threshold; and determining the one or more software tests based on the filtering of the number of software tests to exclude each software test that has the test score that is less than the divergence threshold.

Aspect 5. The system of any of Aspects 1 to 4, wherein the software comprises one or more software stacks of an autonomous vehicle (AV) software.

Aspect 6. The system of any of Aspects 1 to 5, wherein the respective test scores comprise one or more metrics associated with an AV, the one or more metrics comprising at least one of a safety metric, a performance metric, a comfort metric, and an accuracy metric.

Aspect 7. The system of any of Aspects 1 to 6, wherein the divergence threshold is determined based on at least one of an estimated change in a behavior of an AV associated with one or more portions of the software including the one or more changes to the code of the software, one or more actions associated with the one or more portions of the software, and a desired sensitivity or resolution of the repeatability score.

Aspect 8. The system of any of Aspects 1 to 7, wherein the one or more processors are configured to: based on the repeatability score, determine at least one of a repeatability of the particular software test, an error in the one or more changes to the code of the software, and one or more causes of a regression of the repeatability of the particular software test.

Aspect 9. The system of any of Aspects 1 to 8, wherein the system comprises at least one of an autonomous vehicle (AV) and a computer of the AV.

Aspect 10. A method comprising: performing, via one or more processors, a number of software tests at different timepoints, each software test from the number of software tests being based on a test scenario, the test scenario comprising a test simulation environment configured to test a software; determining, via the one or more processors, one or more software tests from the number of software tests having one or more variations in test scores that exceed a divergence threshold, the one or more software tests comprising at least one test scenario; rerunning, via the one or more processors, a particular software test from the one or more software tests a configurable number of times, the particular software test being configured to test one or more changes to a code of the software, wherein the one or more changes to the code of the software are associated with at least one of the particular software test from the one or more software tests and the at least one test scenario; and determining, based on respective test scores generated by rerunning the particular software test the configurable number of times, a repeatability score for the particular software test on the one or more changes to the code of the software.

Aspect 11. The method of Aspect 10, wherein determining the repeatability score for the particular software test on the one or more changes to the code of the software comprises: determining a value indicating a percent of the respective test scores that has a respective test score variation value that is greater than the divergence threshold, wherein the value is within a range of zero to one; and determining the repeatability score based on a result of one minus the value indicating the percent of the respective test scores that has the respective test score variation value that is greater than the divergence threshold.

Aspect 12. The method of any of Aspects 10 or 11, wherein determining the one or more software tests from the number of software tests having one or more variations in test scores that exceed the divergence threshold comprises: identifying each software test, from the number of software tests, that has a test score that is less than the divergence threshold; filtering the number of software tests at different timepoints to exclude each software test that has the test score that is less than the divergence threshold; and determining the one or more software tests based on the filtering of the number of software tests to exclude each software test that has the test score that is less than the divergence threshold.

Aspect 13. The method of any of Aspects 10 to 12, wherein the software comprises one or more software stacks of an autonomous vehicle (AV) software, and wherein the one or more processors are hosted on a computer of the AV.

Aspect 14. The method of any of Aspects 10 to 13, wherein the respective test scores comprise one or more metrics associated with an AV, the one or more metrics comprising at least one of a safety metric, a performance metric, a comfort metric, and an accuracy metric.

Aspect 15. The method of any of Aspects 10 to 14, wherein the divergence threshold is determined based on at least one of an estimated change in a behavior of an AV associated with one or more portions of the software including the one or more changes to the code of the software, one or more actions associated with the one or more portions of the software, and a desired sensitivity or resolution of the repeatability score.

Aspect 16. The method of any of Aspects 10 to 15, further comprising: based on the repeatability score, determining at least one of a repeatability of the particular software test, an error in the one or more changes to the code of the software, and one or more causes of a regression of the repeatability of the particular software test.

Aspect 17. The method of any of Aspects 10 to 16, wherein determining the repeatability score for the particular software test on the one or more changes to the code of the software comprises: determining a percent of the respective test scores that has a respective test score variation value that is at least one of less than the divergence threshold and equal to zero; and determining the repeatability score based on the percent of the respective tests scores that has the respective test score variation value that is at least one of less than the divergence threshold and equal to zero.

Aspect 18. A non-transitory computer-readable medium having stored thereon instructions which, when executed by one or more processors, cause the one or more processors to: perform a method according to any of Aspects 10 to 17.

Aspect 19. A system comprising means for performing a method according to any of Aspects 10 to 17.

Aspect 20. A computer-program product comprising instructions which, when executed by one or more processors, cause the one or more processors to perform a method according to any of Aspects 10 to 17.

Aspect 21. An autonomous vehicle comprising a computing device configured to perform a method according to any of Aspects 10 to 17.

What is claimed is:

1. A system comprising:
a memory; and
one or more processors coupled to the memory, the one or more processors being configured to:
perform a number of software tests at different timepoints, each software test from the number of software tests being based on a test scenario, the test scenario comprising a test simulation environment configured to test a software;
determine one or more software tests from the number of software tests having one or more variations in test scores that exceed a divergence threshold, the one or more software tests comprising at least one test scenario;
rerun a particular software test from the one or more software tests a configurable number of times, the particular software test being configured to test one or more changes to a code of the software, wherein the one or more changes to the code of the software are associated with at least one of the particular software test from the one or more software tests and the at least one test scenario; and
determine, based on respective test scores generated by rerunning the particular software test the configurable number of times, a repeatability score for the particular software test on the one or more changes to the code of the software.

2. The system of claim 1, wherein determining the repeatability score for the particular software test on the one or more changes to the code of the software comprises:
determining a percent of the respective test scores that has a respective test score variation value that is at least one of less than the divergence threshold and equal to zero; and
determining the repeatability score based on the percent of the respective tests scores that has the respective test score variation value that is at least one of less than the divergence threshold and equal to zero.

3. The system of claim 1, wherein determining the repeatability score for the particular software test on the one or more changes to the code of the software comprises:
determining a value indicating a percent of the respective test scores that has a respective test score variation value that is greater than the divergence threshold, wherein the value is within a range of zero to one; and
determining the repeatability score based on a result of one minus the value indicating the percent of the respective test scores that has the respective test score variation value that is greater than the divergence threshold.

4. The system of claim 1, wherein determining the one or more software tests from the number of software tests having one or more variations in test scores that exceed the divergence threshold comprises:
identifying each software test, from the number of software tests, that has a test score that is less than the divergence threshold;
filtering the number of software tests at different timepoints to exclude each software test that has the test score that is less than the divergence threshold; and
determining the one or more software tests based on the filtering of the number of software tests to exclude each software test that has the test score that is less than the divergence threshold.

5. The system of claim 1, wherein the software comprises one or more software stacks of an autonomous vehicle (AV) software.

6. The system of claim 1, wherein the respective test scores comprise one or more metrics associated with an AV, the one or more metrics comprising at least one of a safety metric, a performance metric, a comfort metric, and an accuracy metric.

7. The system of claim 1, wherein the divergence threshold is determined based on at least one of an estimated change in a behavior of an AV associated with one or more portions of the software including the one or more changes to the code of the software, one or more actions associated with the one or more portions of the software, and a desired sensitivity or resolution of the repeatability score.

8. The system of claim 1, wherein the one or more processors are configured to:
based on the repeatability score, determine at least one of a repeatability of the particular software test, an error in the one or more changes to the code of the software, and one or more causes of a regression of the repeatability of the particular software test.

9. The system of claim 1, wherein the system comprises a computer of an autonomous vehicle.

10. A method comprising:
performing, via one or more processors, a number of software tests at different timepoints, each software test from the number of software tests being based on a test scenario, the test scenario comprising a test simulation environment configured to test a software;

determining, via the one or more processors, one or more software tests from the number of software tests having one or more variations in test scores that exceed a divergence threshold, the one or more software tests comprising at least one test scenario;

rerunning, via the one or more processors, a particular software test from the one or more software tests a configurable number of times, the particular software test being configured to test one or more changes to a code of the software, wherein the one or more changes to the code of the software are associated with at least one of the particular software test from the one or more software tests and the at least one test scenario; and determining, based on respective test scores generated by rerunning the particular software test the configurable number of times, a repeatability score for the particular software test on the one or more changes to the code of the software.

11. The method of claim 10, wherein determining the repeatability score for the particular software test on the one or more changes to the code of the software comprises:

determining a value indicating a percent of the respective test scores that has a respective test score variation value that is greater than the divergence threshold, wherein the value is within a range of zero to one; and determining the repeatability score based on a result of one minus the value indicating the percent of the respective test scores that has the respective test score variation value that is greater than the divergence threshold.

12. The method of claim 10, wherein determining the one or more software tests from the number of software tests having one or more variations in test scores that exceed the divergence threshold comprises:

identifying each software test, from the number of software tests, that has a test score that is less than the divergence threshold;

filtering the number of software tests at different timepoints to exclude each software test that has the test score that is less than the divergence threshold; and determining the one or more software tests based on the filtering of the number of software tests to exclude each software test that has the test score that is less than the divergence threshold.

13. The method of claim 10, wherein the software comprises one or more software stacks of an autonomous vehicle (AV) software, and wherein the one or more processors are hosted on a computer of the AV.

14. The method of claim 10, wherein the respective test scores comprise one or more metrics associated with an AV, the one or more metrics comprising at least one of a safety metric, a performance metric, a comfort metric, and an accuracy metric.

15. The method of claim 10, wherein the divergence threshold is determined based on at least one of an estimated change in a behavior of an AV associated with one or more portions of the software including the one or more changes to the code of the software, one or more actions associated with the one or more portions of the software, and a desired sensitivity or resolution of the repeatability score.

16. The method of claim 10, further comprising:

based on the repeatability score, determining at least one of a repeatability of the particular software test, an error in the one or more changes to the code of the software, and one or more causes of a regression of the repeatability of the particular software test.

17. The method of claim 10, wherein determining the repeatability score for the particular software test on the one or more changes to the code of the software comprises:

determining a percent of the respective test scores that has a respective test score variation value that is at least one of less than the divergence threshold and equal to zero; and determining the repeatability score based on the percent of the respective tests scores that has the respective test score variation value that is at least one of less than the divergence threshold and equal to zero.

18. A non-transitory computer-readable medium having stored thereon instructions which, when executed by one or more processors, cause the one or more processors to:

perform a number of software tests at different timepoints, each software test from the number of software tests being based on a test scenario, the test scenario comprising a test simulation environment configured to test a software;

determine one or more software tests from the number of software tests having one or more variations in test scores that exceed a divergence threshold, the one or more software tests comprising at least one test scenario;

rerun a particular software test from the one or more software tests a configurable number of times, the particular software test being configured to test one or more changes to a code of the software, wherein the one or more changes to the code of the software are associated with at least one of the particular software test from the one or more software tests and the at least one test scenario; and determine, based on respective test scores generated by rerunning the particular software test the configurable number of times, a repeatability score for the particular software test on the one or more changes to the code of the software.

19. The non-transitory computer-readable medium of claim 18, wherein determining the repeatability score for the particular software test on the one or more changes to the code of the software comprises:

determining a percent of the respective test scores that has a respective test score variation value that is at least one of less than the divergence threshold and equal to zero; and determining the repeatability score based on the percent of the respective tests scores that has the respective test score variation value that is at least one of less than the divergence threshold and equal to zero.

20. The non-transitory computer-readable medium of claim 18, wherein determining the repeatability score for the particular software test on the one or more changes to the code of the software comprises:

determining a value indicating a percent of the respective test scores that has a respective test score variation value that is greater than the divergence threshold, wherein the value is within a range of zero to one; and determining the repeatability score based on a result of one minus the value indicating the percent of the respective test scores that has the respective test score variation value that is greater than the divergence threshold.

* * * * *